United States Patent [19]

Aoki

[11] Patent Number: 6,012,868
[45] Date of Patent: Jan. 11, 2000

[54] LOCKING STRUCTURE OF CYLINDRICAL BUILDING MEMBERS AND MACHINING APPARATUS FOR THE LOCKING STRUCTURE

[76] Inventor: Yoshihiro Aoki, 6-10-13, Shirahata, Urawa-shi, Saitama, 336, Japan

[21] Appl. No.: 08/914,793

[22] Filed: Aug. 20, 1997

[51] Int. Cl.[7] ............................................. F16B 2/20
[52] U.S. Cl. ..................... 403/326; 403/290; 403/404
[58] Field of Search ................................... 403/326, 328, 403/329, 289, 290, 404; 411/508, 509, 510, 338, 339, 913; 285/921, 382; 24/453, 297

[56] References Cited

U.S. PATENT DOCUMENTS

| | | | |
|---|---|---|---|
| 367,578 | 8/1887 | Babb | 403/329 X |
| 2,063,895 | 12/1936 | Mack | 403/329 X |
| 2,496,700 | 2/1950 | Cole | 403/326 X |
| 2,644,475 | 7/1953 | Morton | 403/326 X |
| 2,909,957 | 10/1959 | Rapata | 411/508 |
| 3,131,899 | 5/1964 | Luhrs | 403/329 X |
| 3,485,006 | 12/1969 | De Rozario | 403/329 X |
| 3,785,584 | 1/1974 | Crellin, Jr. | 403/329 X |
| 4,694,544 | 9/1987 | Chapman | 403/290 X |
| 5,247,549 | 9/1993 | Cearley et al. | 411/913 X |
| 5,651,632 | 7/1997 | Gordon | 403/329 X |
| 5,807,012 | 9/1998 | Emmert et al. | 403/326 X |

*Primary Examiner*—Harry C. Kim
*Attorney, Agent, or Firm*—Nikaido, Marmelstein, Murray & Oram LLP

[57] ABSTRACT

The locking structure of this invention comprises: a gate pillar (1) as a first cylindrical member; a cover (2) as a second member fitted into the first member; locking projections (6) provided to an inner surface of the first member or to an outer surface of the second member, each of the locking projections comprising an inclined surface (6a) progressively rising from the front end side of one of the mating members, from which the other mating member is inserted, toward the rear end side and a locking surface (6b) formed at the rear end of the inclined surface (6a); and locking steps (7) formed in the other member and adapted to engage the locking surfaces (6a) when the two mating members are fitted together. The machining apparatus (A) forms the locking projections (6) by pressing blade portions (9) of tools (8) against the inner surface of the gate pillar (1) with impacts.

4 Claims, 11 Drawing Sheets

FIG. 1
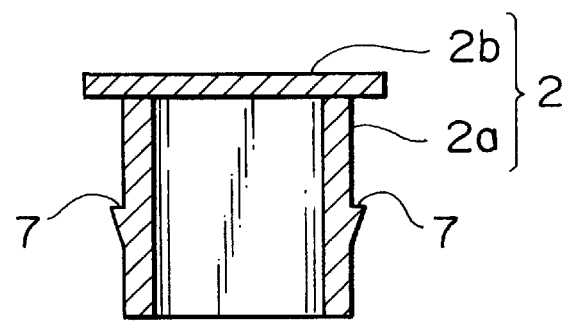
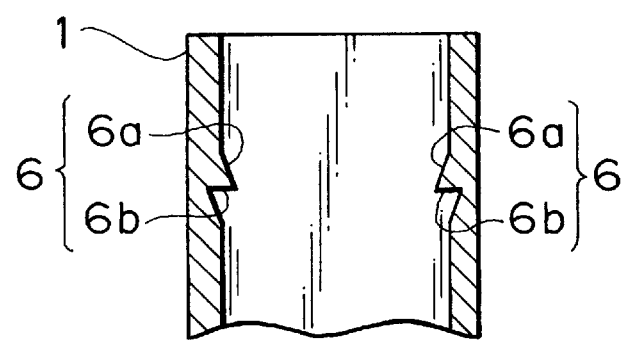
FIG. 2
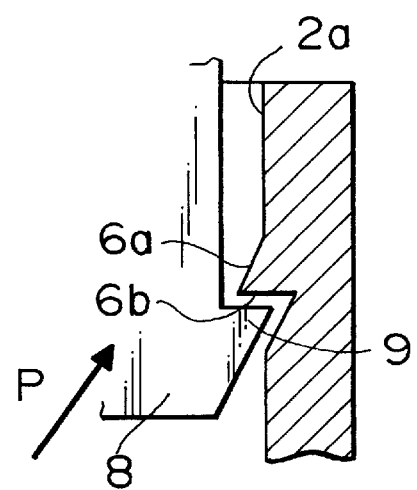

FIG. 9
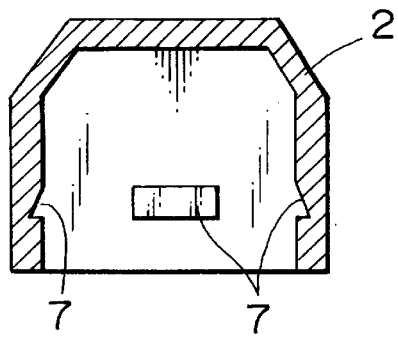
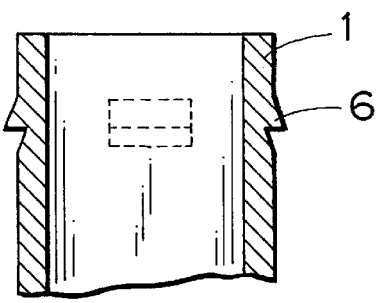
FIG. 10
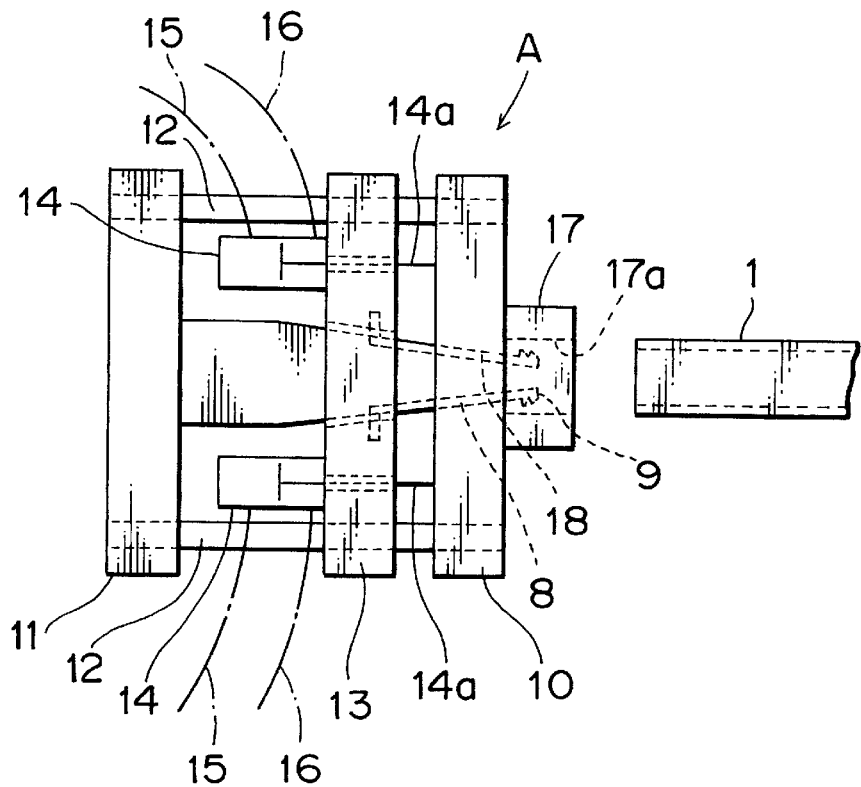

F I G. 1 4
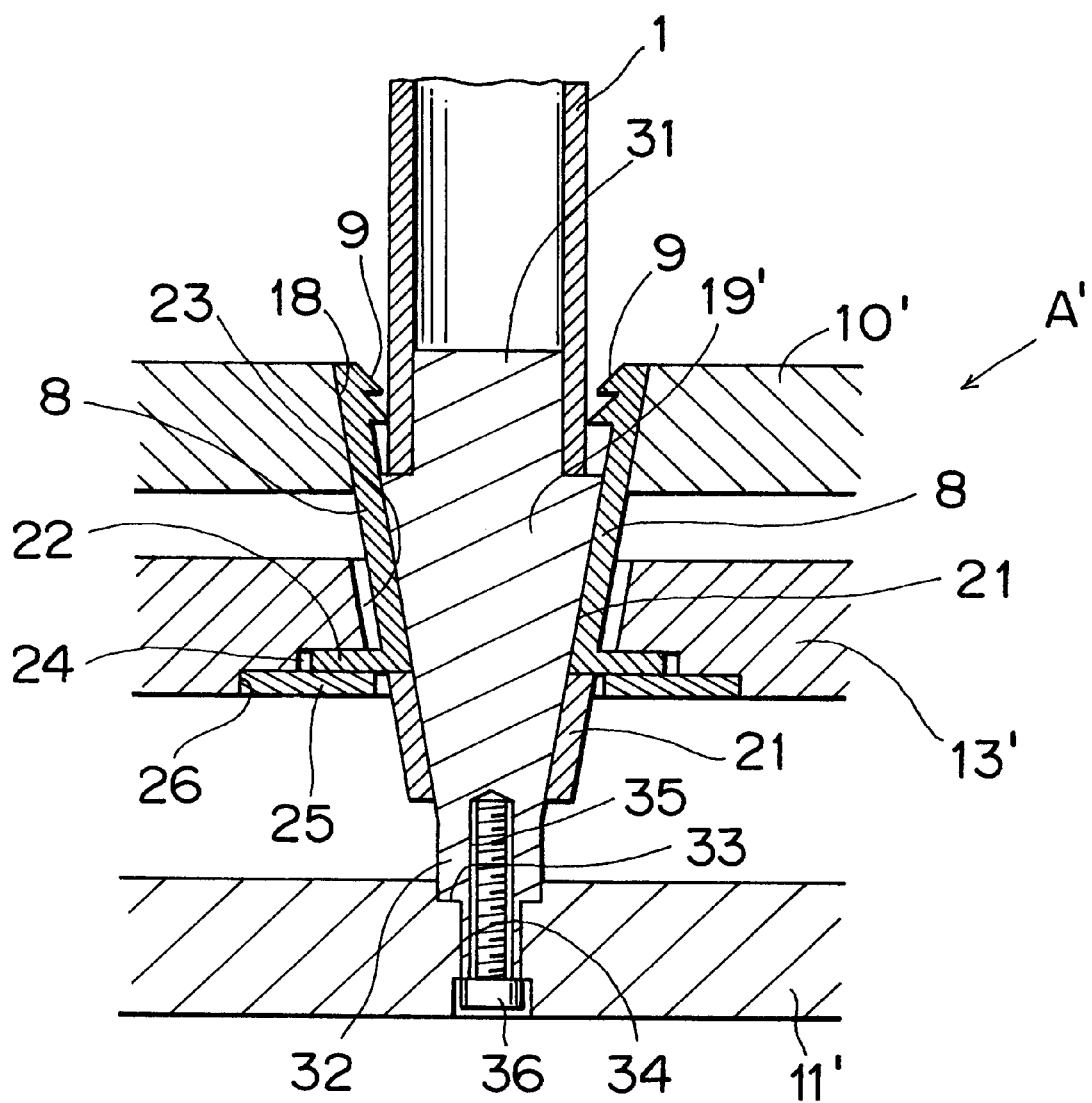

LOCKING STRUCTURE OF CYLINDRICAL BUILDING MEMBERS AND MACHINING APPARATUS FOR THE LOCKING STRUCTURE

BACKGROUND OF THE INVENTION

1. Field of the Invention

The present invention relates to a locking structure which, once a cylindrical building member locks a mating cylindrical member, prevents the locked cylindrical members from becoming loose or dislocated.

2. Description of the Related Art

FIG. 15 is a perspective view showing an essential part of an example gate pillar made of a metallic cylindrical member for building and a cover 2 made of such materials as plastics and fitted at the top of the pillar. The gate pillar 1 is a square cylinder, and the cover 2 comprises a square-cylindrical insertion portion 2a to be fitted into the pillar 1 and a cover portion 2b covering the top surface of the gate pillar 1.

The insertion portion 2a, after being pushed into the pillar 1 by a single pushing action on the part of a worker, is firmly fitted in the pillar 1 in an elastically compressed state which, combined with the cover portion 2b, prevents ingress of rain water into the interior of the pillar 1.

FIG. 16 is a perspective view of another example of a cylindrical metal member for building, in which a corner joint 3 made of an L-shaped cylindrical member is fitted at both ends with a cylindrical beam member 4 and a cylindrical pillar member 5 to form a corner portion of a sash.

In this case, too, the beam member 4 and the pillar member 5 are fitted elastically into the corner joint 3 by a single insertion operation.

The gate pillar 1 receives impacts from the door as it is opened and closed, and the impacts cause the cover 2 to gradually float degrading the appearance of the gate pillar 1.

When the corner joint 3 is applied such impacts, the similar problem also occurs causing loosening and displacement of the beam member 4 and the pillar member 5.

There have been demands for a holding means to prevent the cylindrical locking structures from becoming loose and displaced. But no such appropriate means have been available.

The present invention is designed to solve these problems and to provide an inexpensive locking structure that is very easy to install and can reliably prevent itself from getting loose. It is also an object of this invention to provide a locking structure machining apparatus that can machine the locking structure highly efficiently and inexpensively.

SUMMARY OF THE INVENTION

To achieve the above objective, the locking structure of cylindrical building members comprises: a cylindrical building member; another cylindrical member to be inserted into the first cylindrical member; locking projections provided to an inner surface of the first cylindrical member or to an outer surface of the second cylindrical member, each of the locking projections comprising an inclined surface progressively rising from the front end side of one of the mating members, from which the other mating member is inserted, toward the rear end side and a locking surface formed at the rear end of the inclined surface; and locking steps formed in the other member and adapted to engage the locking surfaces when the two mating members are fitted together.

When one of the mating cylindrical members that is formed with the locking projections is made of a metal material, the locking projections can be formed by plastic deformation caused by striking blade portions of tools against the cylindrical member with impacts.

When the other cylindrical member is made of a synthetic resin, elastic ribs can be provided to the other cylindrical member to urge the other cylindrical member to press against the first cylindrical member.

In a locking structure of building cylindrical members, in which locking projections are formed in an inner surface of a metallic building cylindrical member and locking steps that engage with the locking projections are formed in an outer surface of an insertion portion of a mating cylindrical member; a machining apparatus for forming the locking projections comprises: a bottomed support hole into which a front end portion of the metallic building cylindrical member is inserted; inclined guide grooves communicating with the bottom of the support hole and so inclined that the front ends, on the support hole side, of the inclined guide grooves come close together toward the center of the building cylindrical member; tools slidably inserted in the inclined guide grooves and having blade portions protruding toward the inner surface of the building cylindrical member inserted in the support hole; and a reciprocating table to drive the tools toward and away from the support hole; wherein the blade portions comprise an inclined blade surface rising progressively from the front of the tools toward the rear and a vertical surface formed at the rear end of the inclined blade surface.

In a locking structure of building cylindrical members, in which locking projections are formed in an outer surface of a metallic building cylindrical member and locking steps that engage with the locking projections are formed in an inner surface of a sleeving portion of a mating cylindrical member; a machining apparatus for forming the locking projections comprises: a support projection over which a front end portion of the metallic building cylindrical member is fitted; inclined guide grooves having one end thereof opening to the outside of the building cylindrical member fitted over the support projection and the other end thereof inclining toward a center line of the building cylindrical member; tools slidably inserted in the inclined guide grooves and having blade portions protruding toward the outer surface of the building cylindrical member fitted over the support projection; and a reciprocating table to drive the tools back and forth along the inclined guide grooves; wherein the blade portions comprise an inclined blade surface rising progressively from the front of the tools toward the rear and a vertical surface formed at the rear end of the inclined blade surface.

The above and other objects, features and advantages of this invention will become apparent from the following description and the appended claims, taken in conjunction with the accompanying drawings in which like parts or elements are denoted by like reference characters.

BRIEF DESCRIPTION OF THE DRAWINGS

FIG. 1 is a vertical cross section showing an essential part of a gate pillar and its cover;

FIG. 2 is a vertical cross section showing how locking projections are formed;

FIG. 9 is a vertical cross section showing a gate pillar having locking projections in its outer surface and a cover having locking steps in its inner surface;

FIG. 10 is a schematic plan view of a machining apparatus to form locking projections in the outer surface of the gate pillar;

FIG. 14 is a horizontal cross section showing an essential part of the machining apparatus for forming the locking projections in the outer surface of a gate pillar;

DESCRIPTION OF THE PREFERRED EMBODIMENTS

Figure 3:
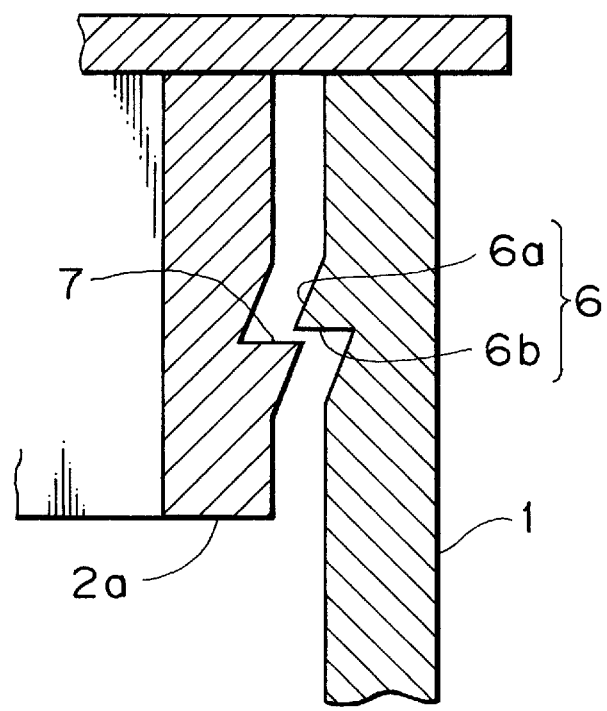
FIG. 3 is a vertical cross section showing how the locking projections and the locking steps engage.

An example embodiment of this invention will be described by referring to the accompanying drawings. FIG. 1 is a vertical cross section showing an essential part of a gate pillar 1 as an example of a cylindrical building member and a cover 2 fitted at the top of the gate pillar 1. The gate pillar 1 is formed into a square cylinder member of such a metal as iron or aluminum.

The cover 2 comprises a square-cylindrical insertion portion 2a to be inserted into the gate pillar 1 and a cover portion 2b covering the top of the gate pillar 1, and is generally molded of a plastic material. The cover 2 may also be made of a metal.

The gate pillar 1 has locking projections 6 formed in its inner surface at the facing positions. The locking projections 6 each comprise an inclined surface 6a progressively rising from the front end side of the pillar, from which the insertion portion 2a is inserted, toward the rear side and a locking surface 6b formed at the rear end of the inclined surface 6a.

The cover 2 has locking steps 7 that engage the locking surfaces 6b when the insertion portion 2a of the cover 2 is inserted until the cover portion 2b contacts the upper end of the gate pillar 1.

The locking steps 7 may be formed integral with the cover 2. The locking projections 6 may be formed easily by striking with impacts a blade 9 of a tool 8 of a machining apparatus A described later to cause plastic deformation in the inner surface of the gate pillar 1.

Next, how the locking structure with the above construction works will be described.

The insertion portion 2a of the cover 2 is pushed with force into the gate pillar 1, so that the end of the insertion portion 2a engages the inclined surface 6a, slightly compressing the insertion portion 2a elastically.

As the insertion portion 2a is further inserted, the locking steps 7 of the cover 2 move along the inclined surfaces 6a, further compressing the insertion portion 2a elastically.

When the cover portion 2b reaches an engagement position where it contacts the upper end of the gate pillar 1, the locking steps 7 ride over the inclined surfaces 6a allowing the insertion portion 2a to recover its original shape elastically, causing the locking steps 7 of the cover 2 to engage the locking surfaces 6b of the gate pillar 1 (see FIG. 3).

Thus, the cover 2 is prevented from getting loose or coming off and remains in place even when the gate pillar 1 is subjected to vibrations or impacts.

Figure 4:
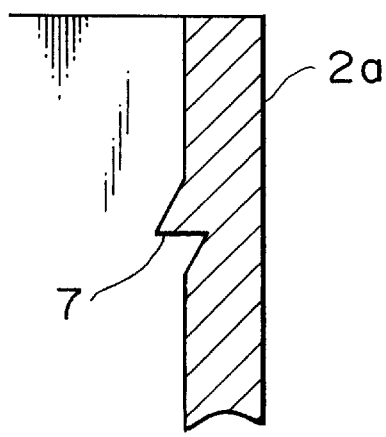
FIG. 4 is a vertical cross section of the locking step formed in the gate pillar.

In the above embodiment, the locking projections 6 are provided to the inner surface of the gate pillar 1 and the locking steps 7 to the outer surface of the insertion portion 2a of the cover 2. Since the locking surfaces 6b of the locking projections 6 and the locking steps 7 are similar in shape, it is possible to use the plastically deformed portion of the gate pillar 1 made by the tool T as the locking steps 7 (FIG. 4) and provide locking projections 6 to the cover 2.

Figure 5:
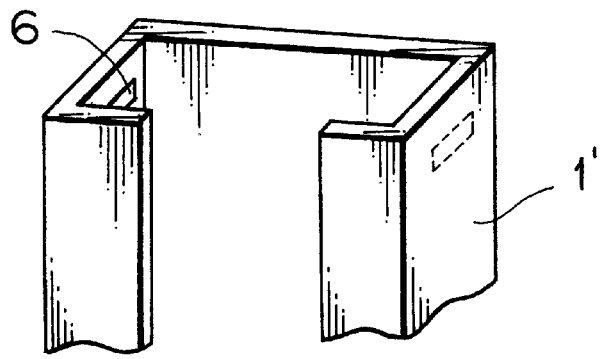
FIG. 5 is a perspective view showing an essential part of a specially shaped cylindrical member having locking projections.

A C-shaped channel member 1' shown in FIG. 5 is a specially shaped square-cylindrical member which has one of its four side walls partially cut open longitudinally. Because this specially shaped member can receive an insertion portion as general cylindrical members do, it can also be provided with the locking projections 6 (or locking steps 7) of this invention.

In the above the engagement between the gate pillar 1 and the cover 2 has been described. This invention can also be applied to the engagement between the corner joint 3 and the beam member 4 and pillar member 5 by providing the locking projections 6 and the locking steps 7 to the engagement portions of these members to hold them without causing any loosening. It is easily understood that these locking projections and locking steps can also be provided to engagement portions of other cylindrical members for building.

Figure 6:
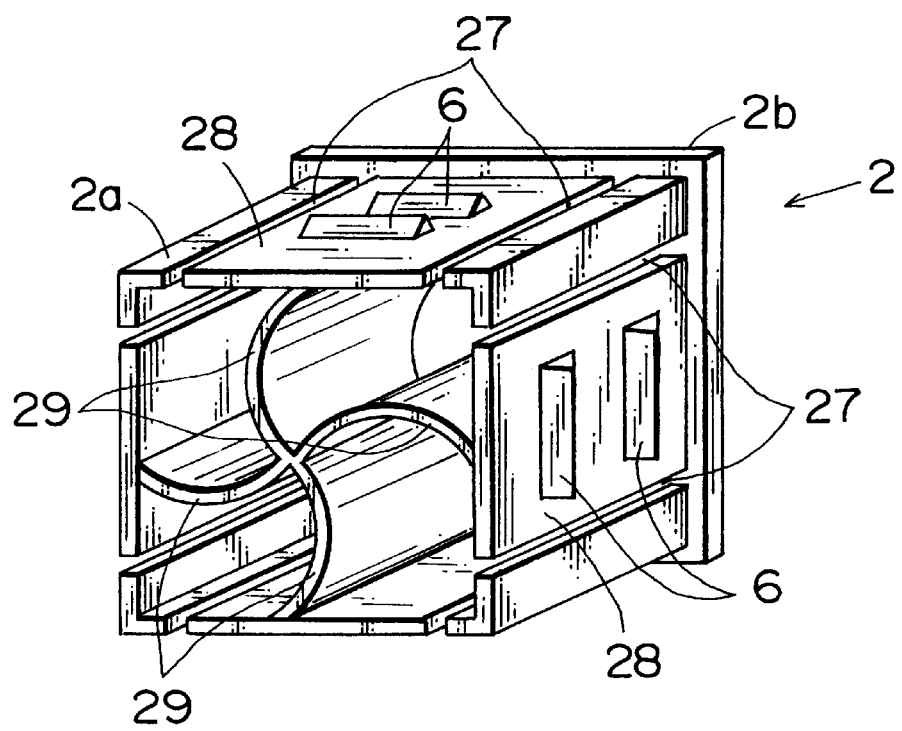
FIG. 6 is a perspective view showing a cover made of a synthetic resin incorporating elastic ribs to reinforce the engagement between the locking projections and the locking steps.

When the cover 2 is made of a synthetic resin and the insertion portion 2a lacks a sufficient elastic recovering force, producing only a weak locking force between the locking projections 6 and the locking steps 7, the outside dimensions of the insertion portion 2a may be set slightly larger than the inner dimensions of the gate pillar 1 to make the engagement a pressure fit and thereby increase the locking force between the locking projections 6 and the locking steps 7. Alternatively, as shown in FIG. 6, slits 27 may be cut near four corners of the insertion portion 2a to form resilient walls 28 between the slits 27, 27, with elastic ribs 29 formed inside the cover 2 to urge the outer surfaces of the resilient walls 28 outwardly to enhance the locking force between the locking projections 6 and the locking steps 7.

Figure 7:
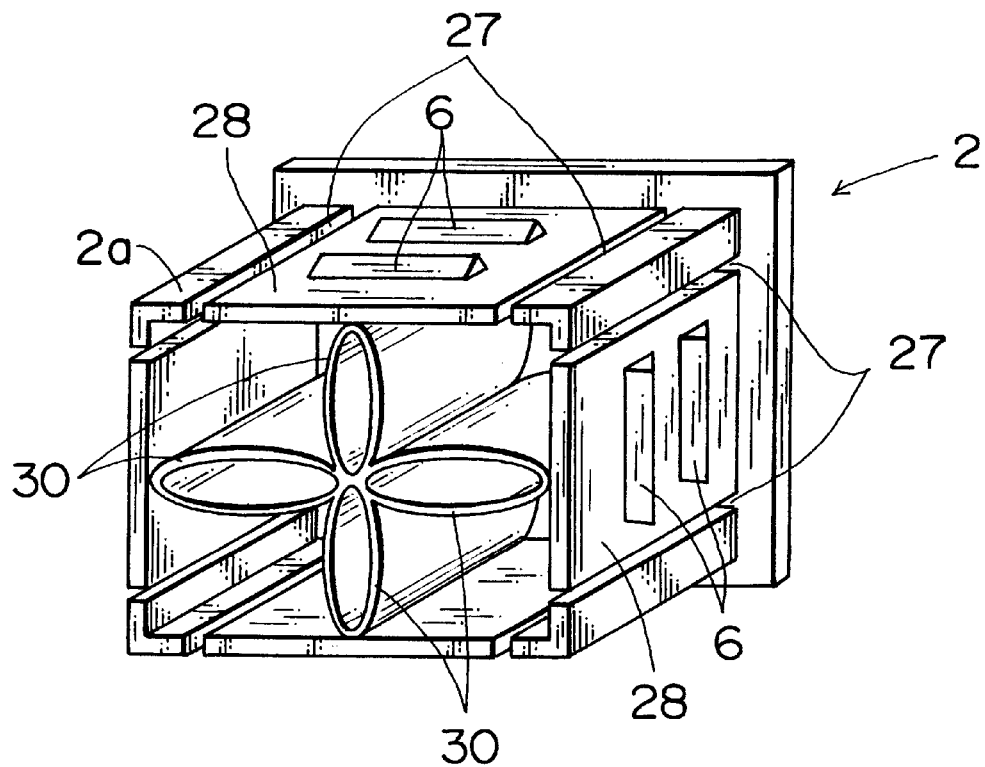
FIG. 7 is a perspective view showing another cover made of a synthetic resin incorporating double-layered elastic ribs to reinforce the engagement between the locking projections and the locking steps.

Also, as shown in FIG. 7, it is possible to use double-layered elastic ribs 30 instead of the elastic ribs 29.

Although the outer surfaces of the insertion portion 2a are urged outwardly even without the slits 27, the provision of the slits 27 that form the elastic walls 28 produces a greater bulging effect of the insertion portion 2a.

Figure 8:
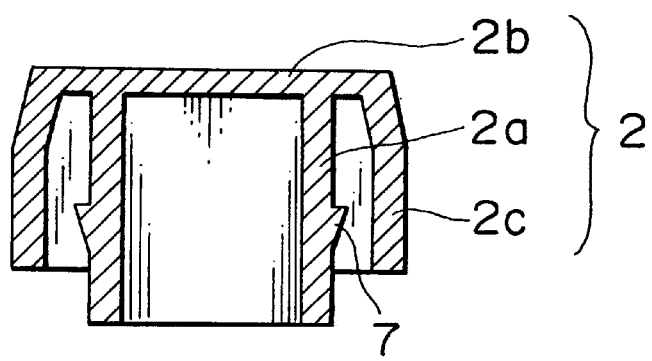
FIG. 8 is a vertical cross section showing a cover having an outer circumferential wall to enclose the engagement projections formed in the outer surface of an insertion portion of the cover.

To protect the locking steps 7 that protrude outwardly from the insertion portion 2a of the cover 2, an outer circumferential wall 2c may be provided that encloses the periphery of the insertion portion 2a of the cover 2 (see FIG. 8).

While the locking projections 6 have been described to be provided to the inner surface of the metallic gate pillar 1, they may be formed on the outer surface of the metallic gate pillar 1, as shown in FIG. 9. In that case, the locking steps 7 are formed on the inner surface, rather than the outer surface, of the cover 2.

Next, we will explain about an embodiment of the machining apparatus used to form the locking projections 6 in the inner surface of the gate pillar 1, a cylindrical building member.

Figure 11:
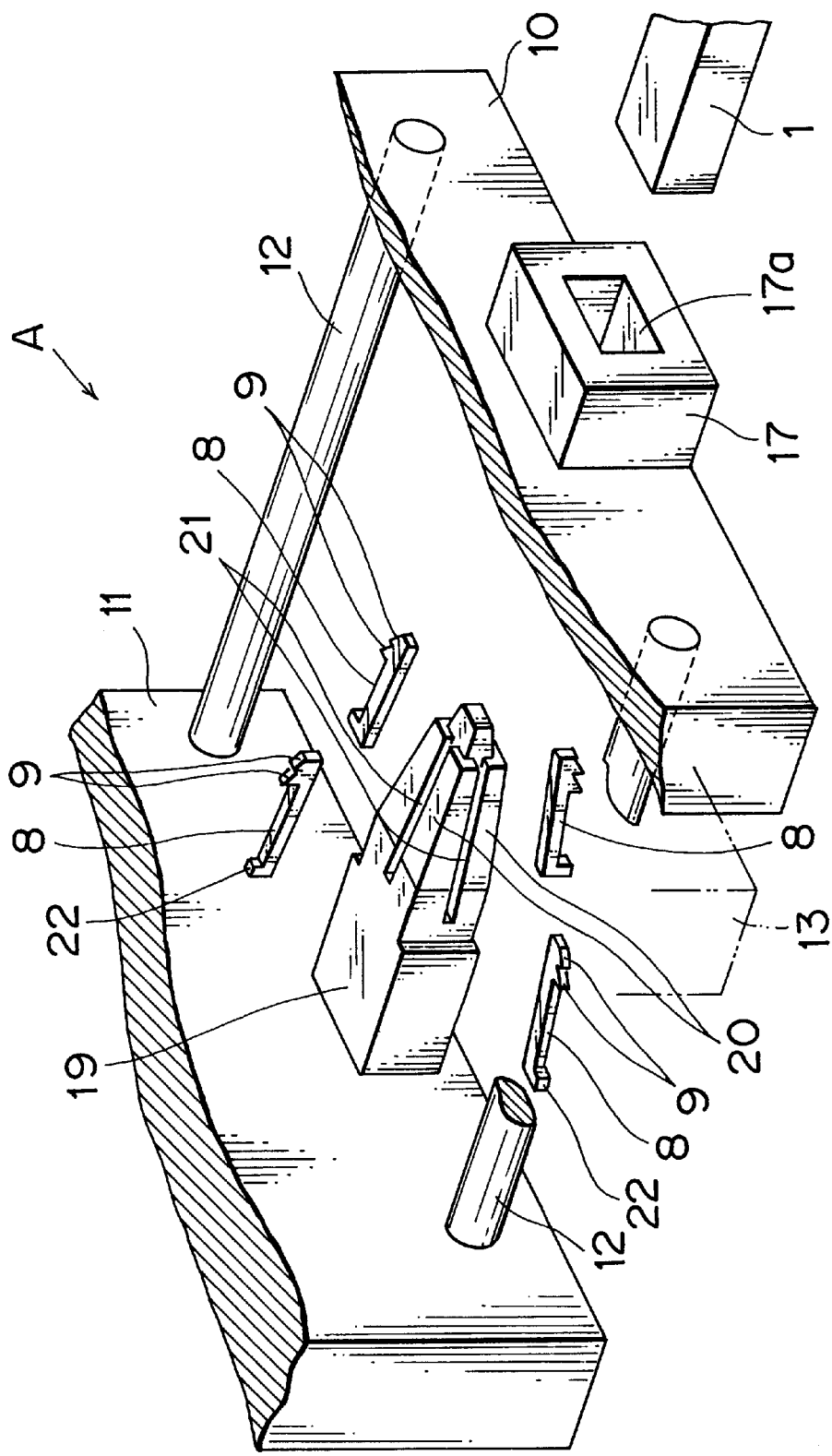
FIG. 11 is a perspective view showing an essential part of the machining apparatus.
Figure 12:
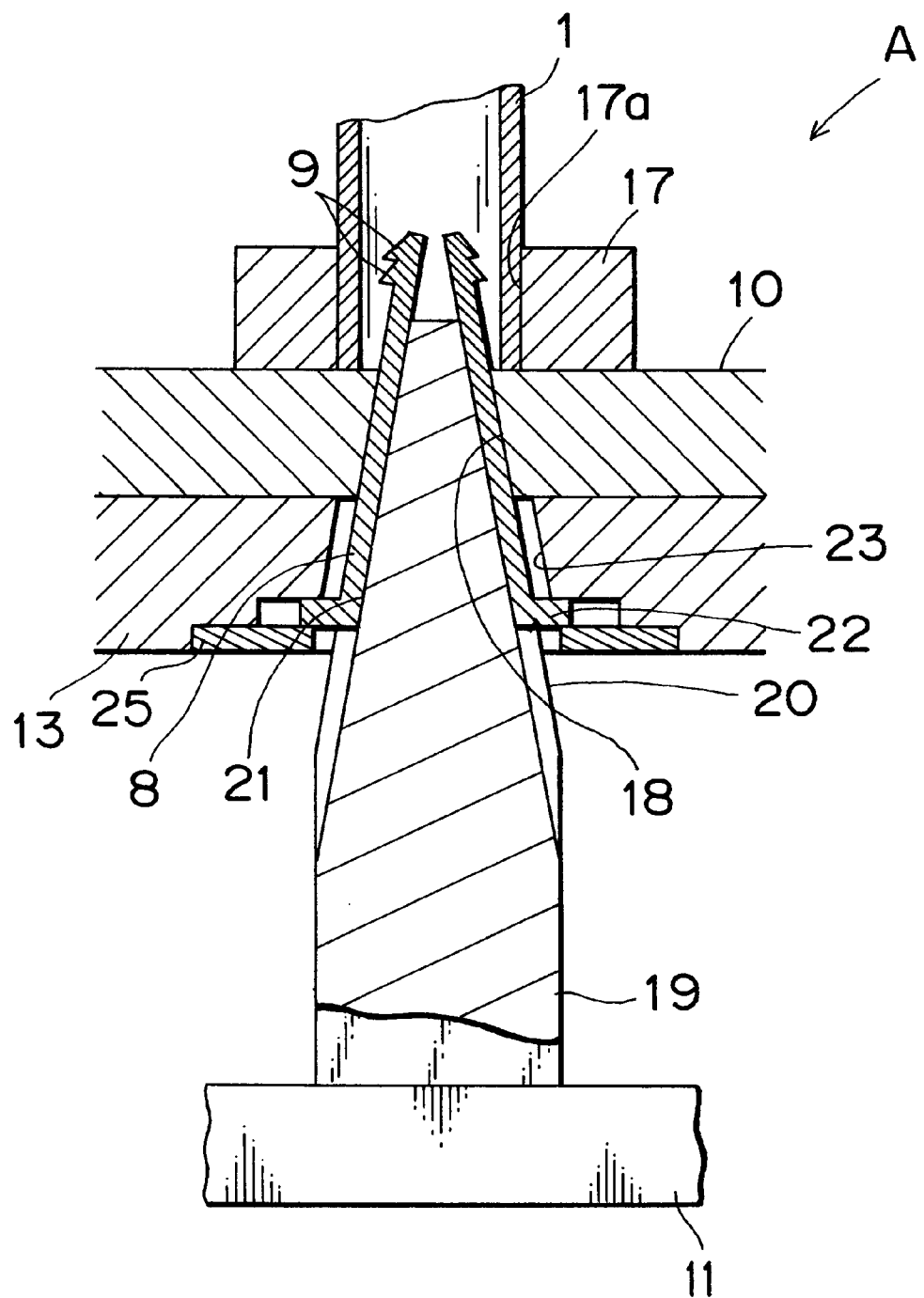
FIG. 12 is a horizontal cross section showing an essential part of the machining apparatus before forming the locking projections.
Figure 13:
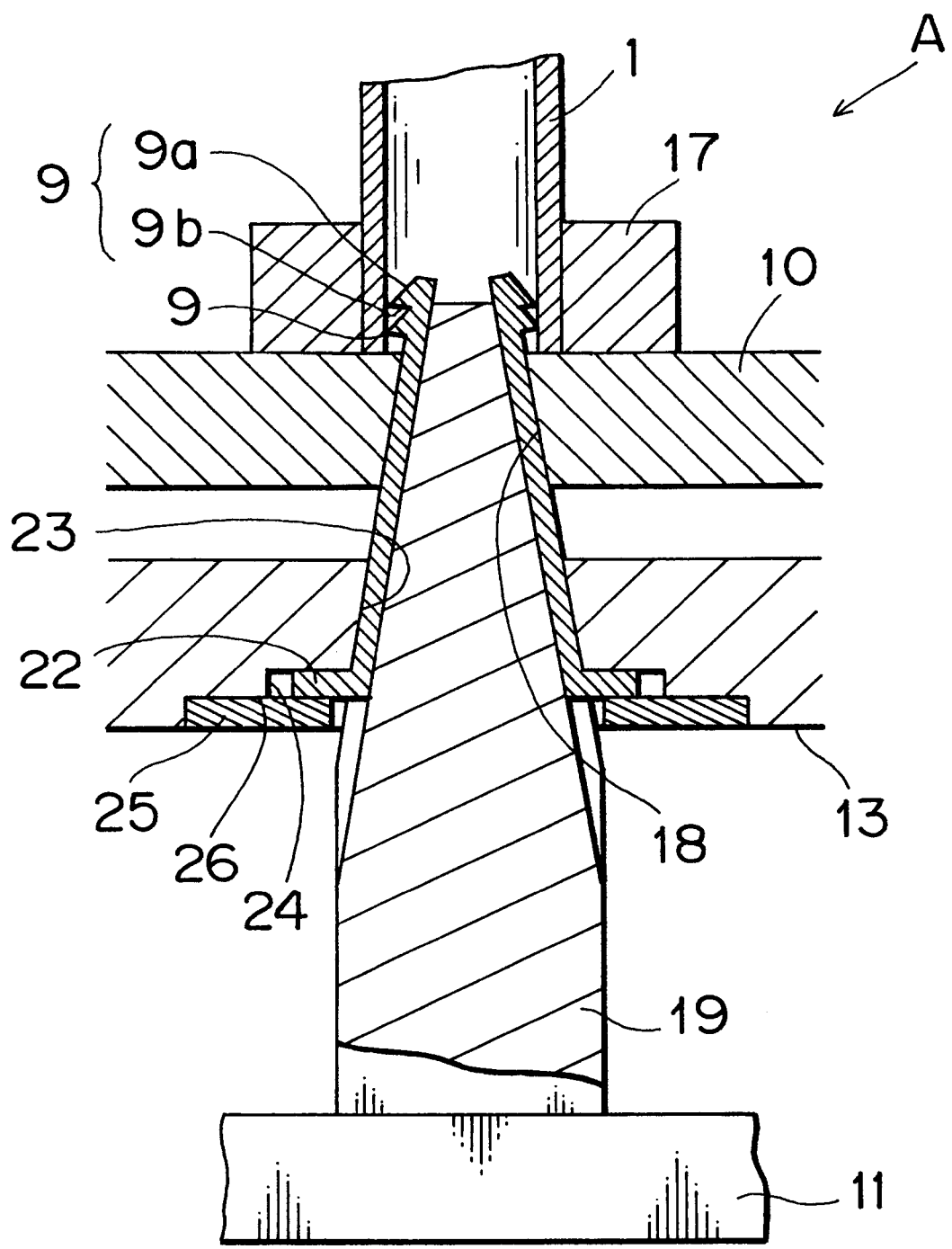
FIG. 13 is a horizontal cross section showing an essential part of the machining apparatus after forming the locking projections.
Figure 15:
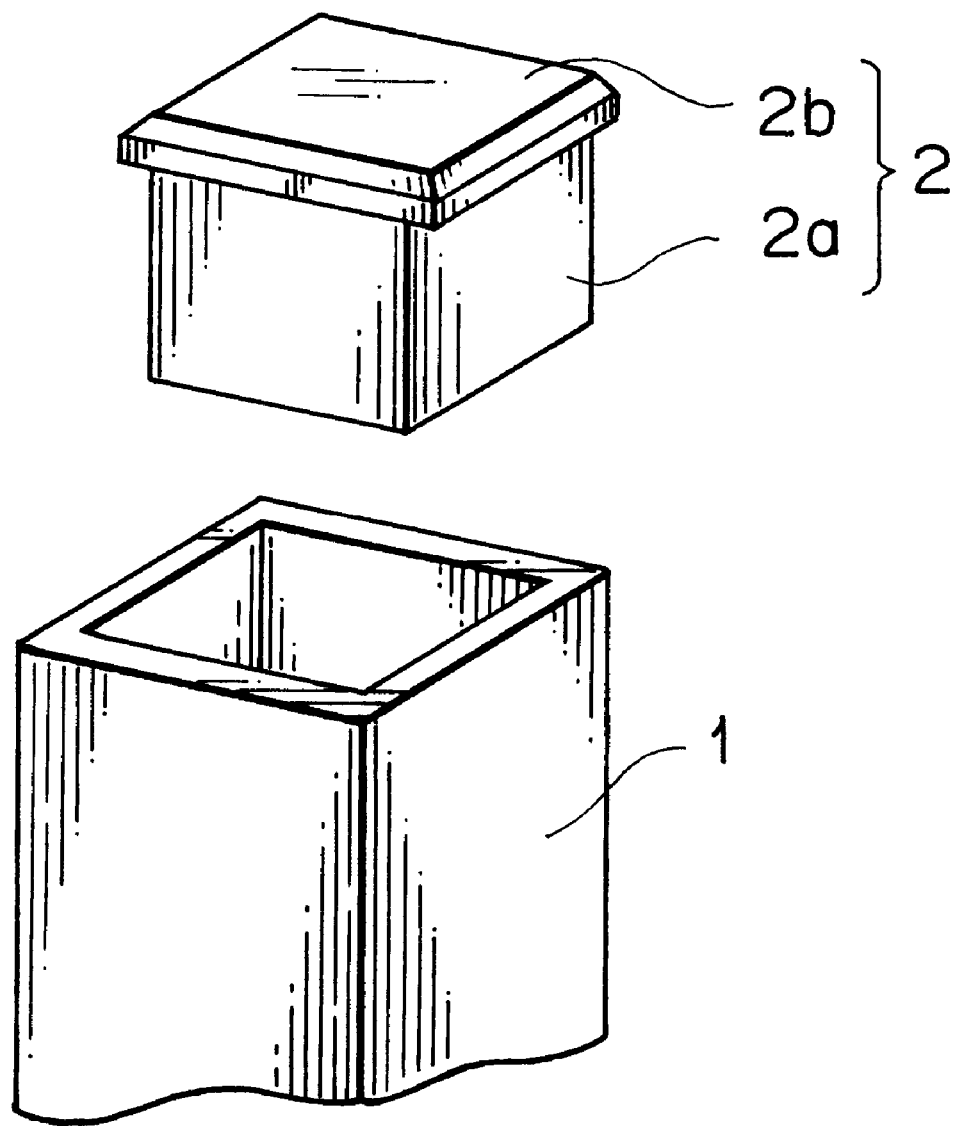
FIG. 15 is a perspective view showing an essential part of a conventional gate pillar and a cover.
Figure 16:
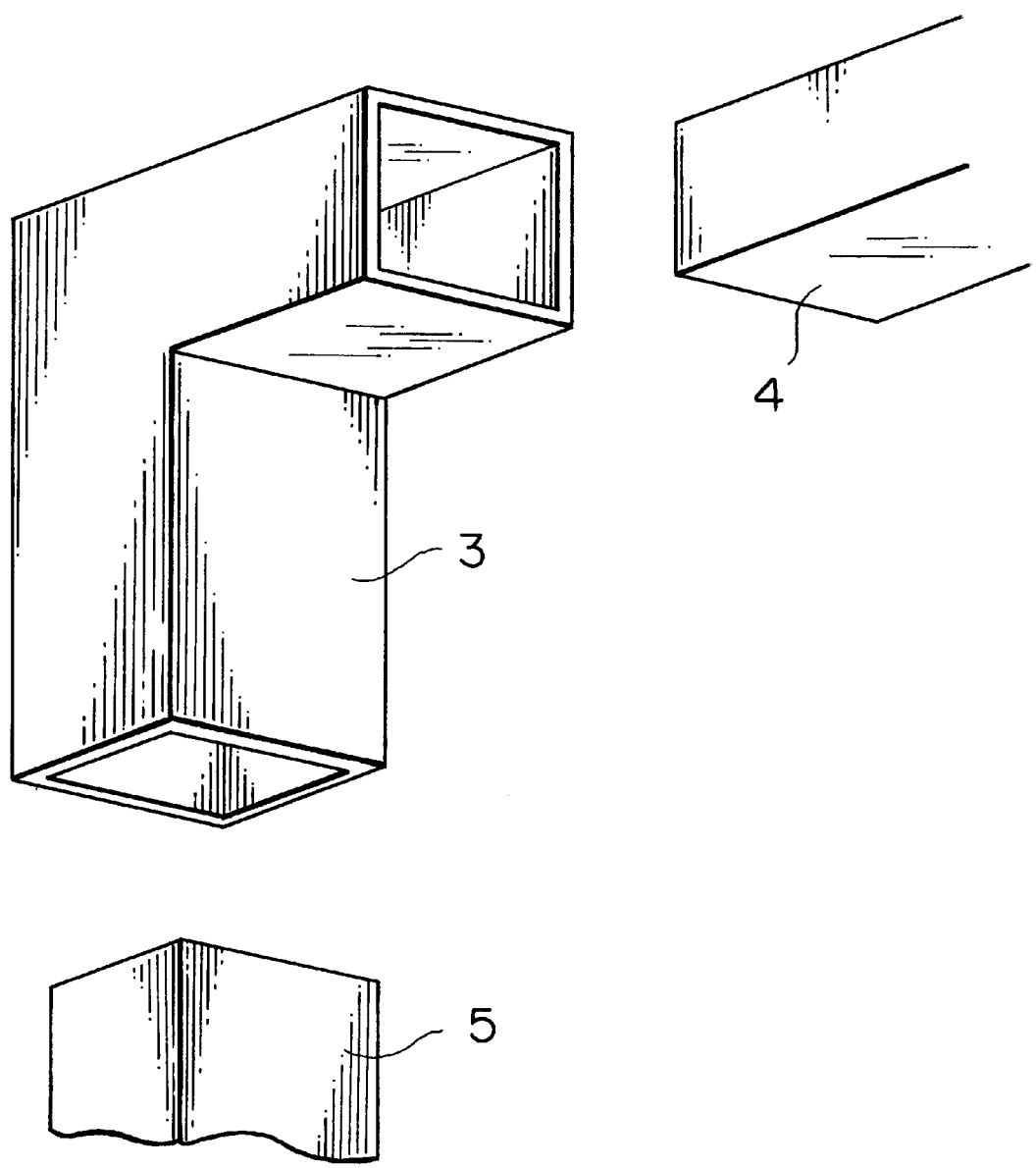
FIG. 16 is a perspective view showing an essential part of a corner joint, a beam member and a pillar member.

FIG. 10 is a schematic plan view of the machining apparatus A. FIG. 11 is a perspective view showing an essential portion of the machining apparatus A. FIG. 12 and 13 are horizontal cross sections showing the machining apparatus before and after forming the locking projections 6.

As shown in FIG. 10, the machining apparatus A has a front stationary plate 10 and a rear stationary plate 11, both made of a rectangular thick plate and spaced from each other, and four guide bars 12 with their front and rear ends inserted and fixed in the front stationary plate 10 and the rear stationary plate 11.

A reciprocating table 13 slidable along the circumferential surfaces of the four guide bars 12 is attached with two hydraulic cylinders 14 whose piston rods 14a are secured at their front ends to the front stationary plate 10.

Pipes 15, 16 connecting to two ports of the hydraulic cylinders 14 are connected through selector valves (not shown) to a hydraulic pressure source or tank (not shown). When the selector valves are operated, the reciprocating table 13 moves along the guide bars 12 to and from the front stationary plate 10.

A support table 17 having a support hole 17a into which the front end of the gate pillar 1 is inserted is screwed into the front surface of the front stationary plate 10 (right-hand side surface in FIG. 10). The depth to which the front end of the gate pillar 1 is inserted is limited by the front surface of the front stationary plate 10 which serves as the bottom surface of the support hole 17a. The support hole 17a is made slightly larger than the gate pillar 1 to prevent the gate pillar 1 from bulging outwardly when making the locking projections 6.

The front stationary plate 10 is formed with a rectangular hole 18 of a truncated pyramid which communicates with the support hole 17a and whose surfaces are tapered off toward the support hole 17a. Secured to the inner surface of the rear stationary plate 11 is a guide rod 19 whose front end is formed into a tapered rectangular shaft 20. The inclined surfaces of the tapered rectangular shaft 20 are placed in contact with the inclined surfaces of the rectangular hole 18 (see FIG. 12).

The inclined surfaces of the tapered rectangular shaft 20 are each formed with a longitudinally extending, inclined guide groove 21. Tools 8 inserted in the inclined guide grooves 21 are slidable along the inclined guide grooves 21 and the rectangular hole 18 (see FIG. 11 and 12).

The tools 8 have a blade portion 9 protruding from the front end thereof toward the inner surface of the gate pillar 1 inserted in the support hole 17a (in this embodiment, two blade portions 9 are provided). The rear end of the tool 8 is provided with a bent portion 22 that project outwardly. The blade portion 9 comprises an inclined blade surface 9a that progressively rises from the front end of the tool 8 toward the rear and a vertical surface 9b formed at the rear end of the inclined blade surface 9a (see FIG. 13).

The reciprocating table 13 has inclined surfaces 23 parallel to the corresponding inclined surfaces of the tapered rectangular shaft 20 (see FIG. 12). At the rear ends of the inclined surfaces 23 are formed stepped portions 24 to receive the bent portions 22 and also stepped portions 26 to accommodate a cover 25. The cover 25 is secured to the stepped portions 26 by screws (not shown) (see FIG. 13). The bent portions 22 of the tools 8 are fitted between the reciprocating table 13 and the cover 25 and reciprocated together with the reciprocating table 13.

Now, the procedure to form the locking projections 6 on the inner surface of the gate pillar 1 by using the machining apparatus A of the above construction will be described.

In the state before machining, the reciprocating table 13 is at an advanced position close to the front stationary plate 10. Vertical and horizontal pairs of tools 8 slide along the inclined guide grooves 21 toward the support hole 17a, causing the blade portions 9 of the pair of tools 8 to come close to each other. The front end of the gate pillar 1 is inserted until it contacts the bottom of the support hole 17a (see FIG. 12).

Next, the selector valves are operated to activate the hydraulic cylinders 14 to retract the reciprocating table 13 away from the front stationary plate 10, causing the vertical and horizontal pairs of tools 8 to retract along the inclined guide grooves 21, with the result that the blade portions 9 strike against the inner surface of the gate pillar 1 (FIG. 13) forming the locking projections 6 in the inner surface of the gate pillar 1 (FIG. 2). When the blade portions 9 strike against the inner surface of the gate pillar 1, the gate pillar 1 tends to expand outwardly. But the support hole 17a blocks the deformation of the gate pillar 1.

Then, the hydraulic cylinders 14 are operated to advance the reciprocating table 13 to return the machining apparatus A to the original state before machining. In this condition the gate pillar 1, which was formed with the locking projections 6, can be taken from the support hole 17a. Thus, one cycle of forming the locking projections 6 is finished. The machining apparatus A is now ready to process the next gate pillar 1.

In the above description of the machining apparatus A, the four surfaces of the tapered rectangular shaft 20 are each formed with one inclined guide groove 21 and the vertical and horizontal pairs of tools 8 are inserted one in each inclined guide groove 21. It is noted, however, that the total number of tools is not limited to four. For example, only one pair of opposed surfaces of the tapered rectangular shaft 20 may be provided with the inclined guide grooves 21, in which only one pair of tools 8 are inserted. Alternatively, the four surfaces of the tapered rectangular shaft 20 may each be formed with two inclined guide grooves 21, in which two vertical pairs and two horizontal pairs of tools 8 are inserted. In either case, all the locking projections 6 can be formed in a single reciprocal motion of the reciprocating table 13.

Although the selector valves are used in the machining apparatus to activate the hydraulic cylinders 14, it is possible to use a sensor that detects when the gate pillar 1 is inserted into the support hole 17a and to operate solenoid valves in response to a detection signal from the sensor to activate the hydraulic cylinders 14, which may then be restored to the original position by a timer. This ensures more efficient machining work. Further, the reciprocating table 13 may be driven back and forth by a press instead of the hydraulic cylinders 14.

FIG. 14 is a horizontal cross section showing an essential part of a locking structure machining apparatus A', which is similar to the machining apparatus A shown in FIG. 11 to 13 in that a reciprocating table 13' is installed movable between a front stationary plate 10' and a rear stationary plate 11' with a guide rod 19' secured to the rear stationary plate 11'. The guide rod 19' is formed into a rectangular pyramid that expand toward the front end (in FIG. 14, an upper end), which is formed with a rectangular cylindrical stay 31, over which the gate pillar 1 is fitted. The lower end of the guide rod 19' is formed with a circular cylindrical connecting portion 32.

The rear stationary plate 11' is formed with a recess 33 that receives the connecting portion 32. At the bottom of the recess 33 is formed a piercing hole 34. The connecting portion 32 has a threaded hole 35 at its bottom, into which a screw 36 is screwed through a hole 34 of the rear stationary plate 11' to secure the guide rod 19' to the rear stationary plate 11'.

The guide rod 19' is formed with longitudinally extending inclined guide grooves 21 in its side walls, in which the tools 8 are slidably inserted. Because the thickness of the tools 8 is almost equal to the depth of the inclined guide grooves 21, the surfaces of the tools 8 are almost flush with the surface of the guide rod 19'. In FIG. 14, the tools 8 have a blade portion 9 at the upper end thereof and a bent portion 22 at the lower end thereof.

The reciprocating table 13' has inclined surfaces 23 formed therein that together form a rectangular pyramidal space. A gap is formed between these inclined surfaces 23 and the guide rod 19'. At the lower part of the inclined surfaces 23 are formed stepped portions 24, below which are also formed stepped portions 26. The bent portions 22 of the tools 8 are slidably installed between the stepped portions 24 and a cover 25 secured to the lower stepped portions 26. This arrangement is similar to that of the machining apparatus A.

As in the machining apparatus A, the reciprocating table 13' is movable along guide bars (not shown) that are secured at both ends to the front stationary plate 10' and the rear stationary plate 11'. The front stationary plate 10' is formed with a truncated rectangular pyramidal hole 18, into which the guide rod 19' is inserted.

The process of forming the locking projections 6 in the outer surface of the gate pillar 1 by using the machining apparatus A' will be explained. Before machining, as shown in FIG. 14, the reciprocating table 13' is in an advanced position close to the front stationary plate 10'. The gate pillar 1 is fitted over the rectangular cylindrical stay 31, with the end of the gate pillar 1 in contact with the upper surface of the guide rod 19'.

When the reciprocating table 13' is driven downwardly by a hydraulic device similar to that used in the machining apparatus A, the tools 8 held in the reciprocating table 13' move down the inclined guide grooves 21 of the guide rod 19', causing the blade portions 9 of the tools 8 to form the locking projections 6 in the outer surface of the gate pillar 1. Because the inner surface of the gate pillar 1 fits over the rectangular cylindrical stay 31, the gate pillar 1 will not deform inwardly when subjected to the machining pressure of the blade portions 9.

Because of the construction described above, the present invention offers the following advantages.

(1) Two cylindrical members for building can be locked together by a simple operation of pushing one member into the other and, once locked, can be kept from becoming loose.

(2) If the cylindrical members are made of metallic materials, the locking projections or locking steps can be formed by striking the tools against the cylindrical members. This reduces the cost of the locking structure significantly.

(3) When the mating cylindrical member is made of a synthetic resin, the locking force of the locking structure can be increased by providing elastic ribs inside the mating cylindrical member.

(4) The use of the machining apparatus of this invention enables the locking projections to be formed efficiently without causing the metallic cylindrical member to bulge and deform.

What is claimed is:

1. A locking structure of hollow building members comprising:

a first hollow member;

a second hollow member to be insertedly fitted into said first hollow member;

locking projections provided to an inner surface of said first hollow member or to an outer surface of said second hollow member, each of said locking projections comprising an inclined surface progressively rising from a front end side of one of said members, from which the other member is fitted, toward a rear end side and a locking surface formed at a rear end of said inclined surface;

locking steps formed in the other member and adapted to engage said locking surfaces when said two members are fitted together; and an elastic means provided to extend between inner surfaces of said second hollow member for elastically urging said second hollow member to press against said first member;

wherein one of said first and second hollow members formed with said locking projections is made of a metal material, and said locking projections are formed by plastic deformation caused by striking blade portions of a tool with impacts against said inner surface of said first hollow member or said outer surface of said second hollow member on which said locking projections are provided.

2. A locking structure of hollow building members according to claim 1, wherein the hollow member formed with said locking steps is made of a synthetic resin.

3. A locking structure of hollow building members comprising:

a first hollow member;

a second hollow member to be insertedly fitted into said first hollow member;

locking projections provided to an inner surface of said first hollow member or to an outer surface of said second hollow member, each of said locking projections comprising an inclined surface progressively rising from a front end side of one of said members, from which the other member is fitted, toward a rear end side and a locking surface formed at a rear end of said inclined surface;

locking steps formed in the other member and adapted to engage said locking surfaces when said two members are fitted together; and an elastic means provided to extend between inner surfaces of said second hollow member for elastically urging said second hollow member to press against said first member;

wherein said elastic means comprises a plurality of circumferentially-curved elastic ribs extending radially from a center to said inner surfaces of said second hollow member.

4. A locking structure of hollow building members comprising:

a first hollow member;

a second hollow member to be insertedly fitted into said first hollow member;

locking projections provided to an inner surface of said first hollow member or to an outer surface of said second hollow member, each of said locking projections comprising an inclined surface progressively rising from a front end side of one of said members, from which the other member is fitted, toward a rear end side and a locking surface formed at a rear end of said inclined surface;

locking steps formed in the other member and adapted to engage said locking surfaces when said two members are fitted together; and an elastic means provided to extend between inner surfaces of said second hollow member for elastically urging said second hollow member to press against said first member;

wherein said elastic means comprises a plurality of double-layered ribs extending radially from a center to said inner surfaces of said second hollow member.

* * * * *